United States Patent [19]
Rourke

[11] Patent Number: 5,352,069
[45] Date of Patent: Oct. 4, 1994

[54] METHOD AND APPARATUS FOR A NUMERICALLY CONTROLLED TAPPING MACHINE

[76] Inventor: Edward G. Rourke, 20705 Cheney Dr., Topanga, Calif. 90290

[21] Appl. No.: 44,716

[22] Filed: Apr. 12, 1993

[51] Int. Cl.$^5$ .......................... B23B 35/00; B23G 1/02
[52] U.S. Cl. ....................... 408/1 R; 408/9; 470/45
[58] Field of Search ............ 408/1 R, 8–11; 470/44, 45

[56] References Cited

U.S. PATENT DOCUMENTS

| | | | |
|---|---|---|---|
| 4,077,736 | 3/1978 | Hutchens | 408/9 X |
| 4,692,071 | 9/1987 | Hirota | 408/10 X |
| 4,879,660 | 11/1989 | Asakura et al. | 408/10 X |
| 5,062,744 | 11/1991 | Nakamura et al. | 408/8 |

Primary Examiner—Steven C. Bishop
Attorney, Agent, or Firm—Daniel L. Dawes

[57] ABSTRACT

An improved numerically controlled machine tool is provided by resiliently coupling an independent drive mechanism to a toolholder which in turn is fitted to the numerically controlled machine. The drive mechanism in turn is coupled to a working tool used for drilling, tapping, milling or other machine functions. The drive mechanism and the toolholder are resiliently coupled together so that they may be relatively displaced one with respect to each other depending upon the amount of vertical force being through the working tool applied to the drive mechanism tending to urge the drive mechanism either toward or away from the toolholder. The torque, power and/or rate of rotation of the working tool is controlled as a function of the relative displacement of the working tool with respect to the toolholder along a predetermined axis of coupling between them. A longitudinal force exerted on the working tool is a function of a spring constant of the resilient coupling between the drive mechanism and toolholder and their relative displacement. The vertical thrust of the working tool is hence both proportional and limited.

17 Claims, 3 Drawing Sheets

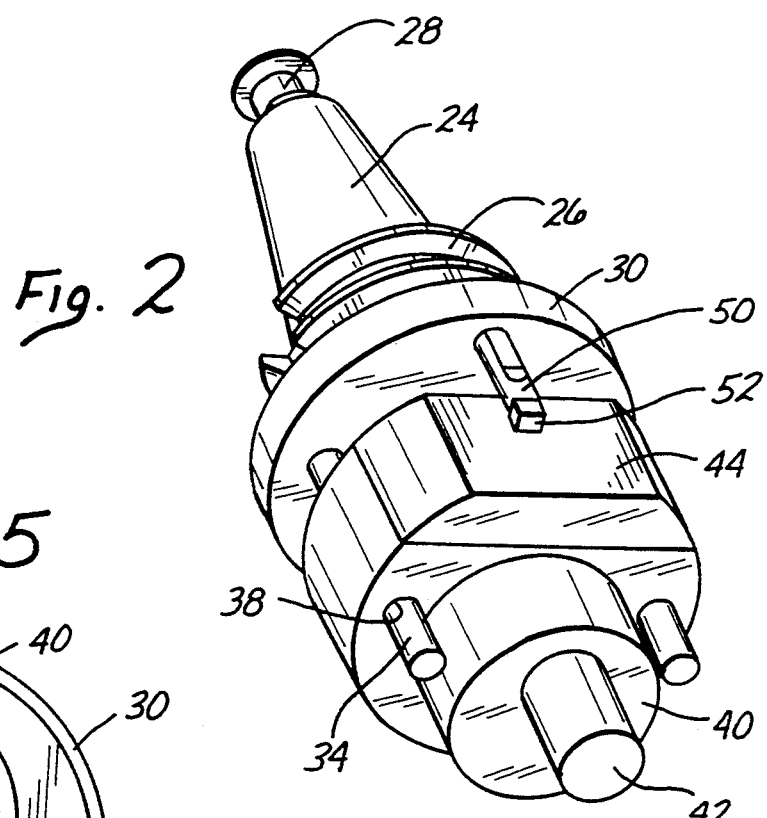
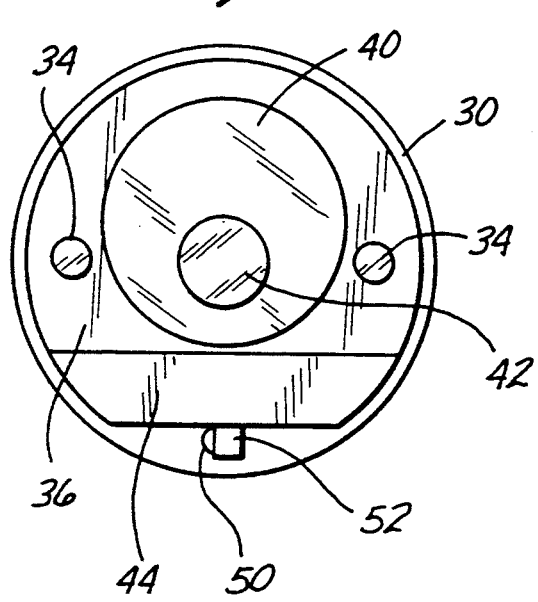
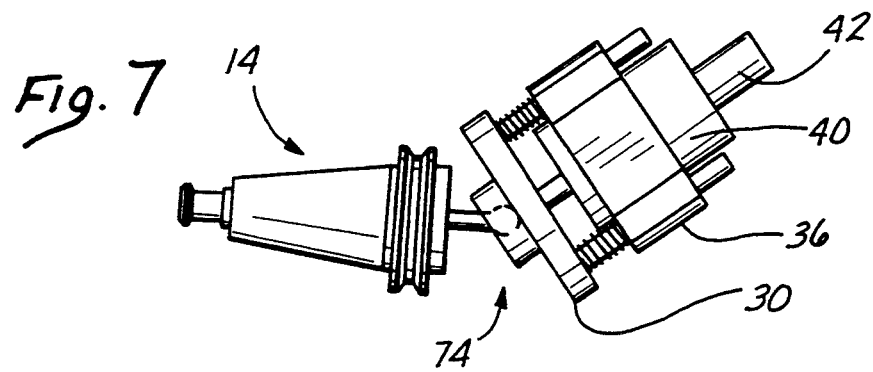

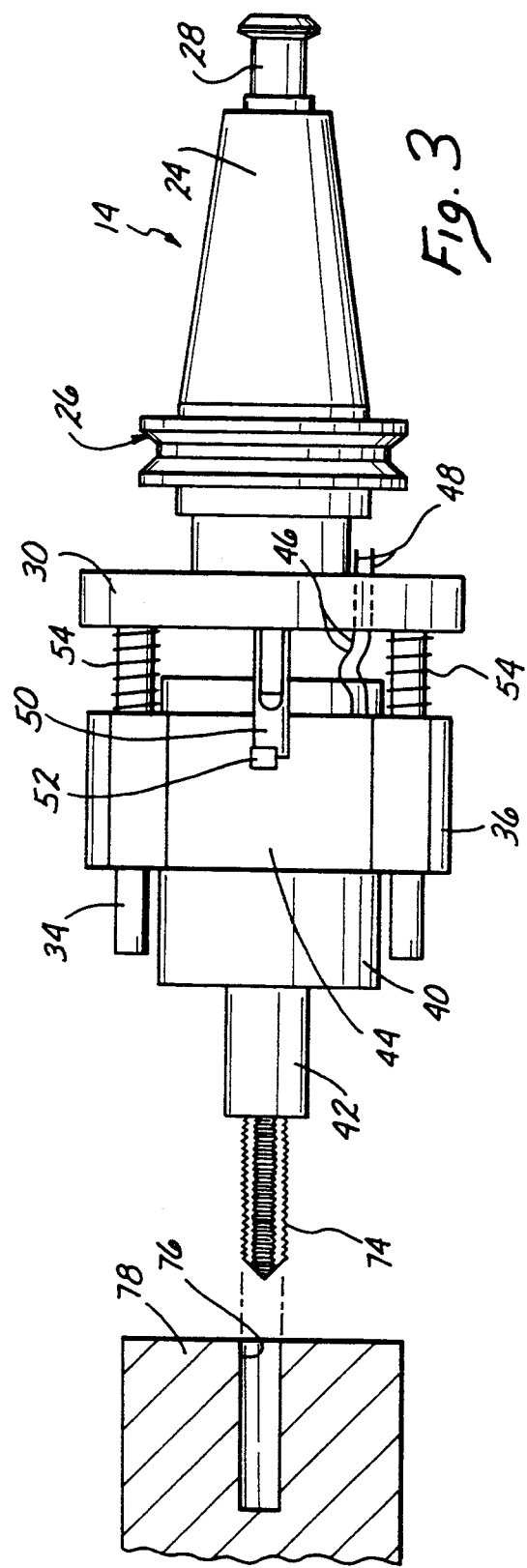
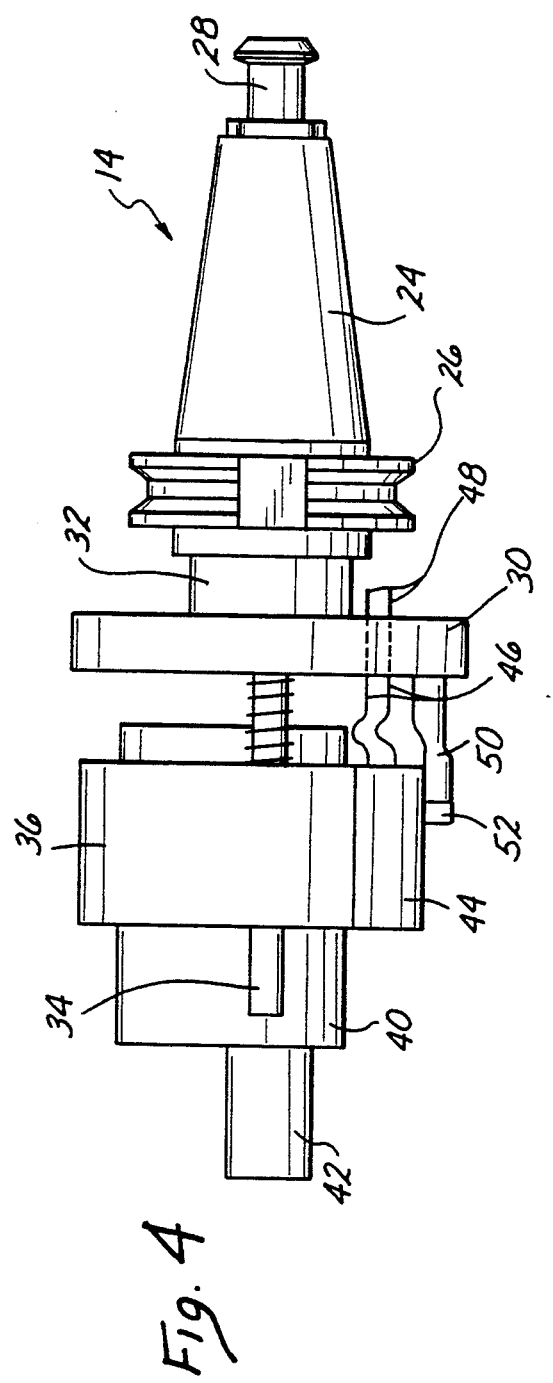

METHOD AND APPARATUS FOR A NUMERICALLY CONTROLLED TAPPING MACHINE

BACKGROUND OF THE INVENTION

1. Field of the Invention

The present invention relates to the field of numerically control machines and in particular to a numerically controlled tapping machine having an independent drive motor for the tap.

2. Description of the Prior Art

Numerically controlled machines typically use a motor driven spindle which is operated by a computer. It is known in the art to sense a spindle function, such as thrust of the spindle, and perform some control function in response to this information. See Alexander et al., U.S. Pat. No. 4,854,786 and Eckman, U.S. Pat. No. 4,688,970.

However, in a tapping machine it is necessary for the tapping tool to rotate in a first sense as its taps downwardly into the bore to be threaded, stop when the threading is compete and then reverse it sense rotation as the tap is removed from the threaded bore. In the prior art, the advance of the spindle into the workpiece has been coordinated with control of the rotation of the spindle according to predetermined calculations or assumptions made with respect to the permissible rate of advance of the tapping tool within the workpiece. Clearly, a vertical advance or retreat of the spindle at a rate which is either excessively fast or slow compared to the rate which the tapping tool can cut threads into or unscrew from the threaded bore, at the very least places stress upon the tapping tool and machine threads, causes excessive and premature wear of the tapping tool, and in the worst case either breaks the tool or strips the threads.

Therefore, what is needed is some type of method and apparatus whereby the operation of the tool on a spindle can be independently controlled and in particular some type of method and mechanism for appropriately driving a tapping tool both when cutting threads as well as unscrewing from the threads just cut.

BRIEF SUMMARY OF THE INVENTION

The invention is an apparatus for use with a computer controlled machine. The invention comprises a toolholder adapted for coupling with the computer controlled machine. An independent drive mechanism drives a working tool. The drive mechanism is resiliently coupled to the toolholder. A control circuit controls the drive mechanism. The control circuit is responsive to relative displacement of the drive mechanism with respect to the toolholder so that the working tool is driven as a function of the relative displacement between the too! holder and drive mechanism. As a result, machining by the computer control machine is improved and effective lifetime of the working tool extended.

The independent drive mechanism selectively rotates the working tool about a predetermined axis parallel to the longitudinal axis of the toolholder. The working tool is rotated with a torque proportional to the relative displacement between the toolholder and the drive mechanism.

In an alternative embodiment the toolholder has a longitudinal axis and the predetermined axis of the drive mechanism is arbitrarily oriented with respect to the longitudinal axis of the toolholder.

The control circuit increases and decreases the rate of rotation of the working tool as a function of the relative displacement between the toolholder and the working tool coupled to the drive mechanism or drive mechanism.

Torque, or power is applied to the working tool by the drive mechanism and the torque or power is controlled by the control circuit as a function of the relative displacement between the toolholder and the drive mechanism. Alternatively, the control circuit controls the rate of rotation and direction of rotation of the working tool as driven by the drive mechanism as a function of the relative displacement between the toolholder and the drive mechanism.

The drive mechanism is resiliently coupled to the toolholder by at least one spring. The control circuit controls the drive mechanism such that vertical force applied to the working tool is a function of only spring compression or spring extension. In the illustrated embodiment the working tool is a tap.

The control circuit comprises a detector for measuring relative displacement of the drive mechanism with respect to the toolholder. A variable pulse generator is coupled to the detector for measuring the relative displacement and responsive thereto to generate a control pulse having a duty cycle which is a function of the relative displacement. An H-switch is coupled to the pulse generator having an output. The independent drive mechanism comprises a motor coupled to the output of the H-switch.

The detector for measuring the relative displacement comprises a permanent magnet fixed with respect to the toolholder and a Hall effect device disposed adjacent to the permanent magnet and fixed relative to the drive mechanism. The Hall effect device generates a trigger signal which is a function of relative displacement of the permanent magnet and Hall effect device. The trigger signal is coupled to the pulse generator to control pulse widths of pulses output from the pulse generator.

The invention can also be characterized as an apparatus for use with a computer controlled machine tool comprising a toolholder coupled to the machine tool, a working tool, and an independent drive mechanism coupled to the working tool for driving the working tool. The drive mechanism is also coupled to the toolholder, so that the computer controlled machine tool selectively positions the drive mechanism and so that machining force is provided to the working tool solely through the drive mechanism.

The invention is still further characterized as a method for machining a workpiece comprising the steps of selectively disposing a tool fixture by element of a computer controlled machine, and driving a working tool coupled to the tool fixture independently from disposition of the tool fixture by element of the computer controlled machine. The working tool is driven as a function of sensed machining performed by the working tool on the workpiece. As a result, tool life is extended.

The method relatively displaces the working tool with respect to the tool fixture, and controls the driving the working tool as a function of the degree of relative displacement of the working tool with respect to the toolholder. The method controls the sense and the rate of rotation of the working tool, driving the tool comprises rotating the working tool. The working tool has a longitudinal axis about which the tool is rotated and the amount of force applied to the working tool along the longitudinal axis is controlled simultaneously with the rate of rotation of the tool about the longitudinal axis.

The invention may better visualized by now turning to the following drawings wherein like elements are referenced by like numerals.

BRIEF DESCRIPTION OF THE DRAWINGS

FIG. 2 is perspective view of the tool of the invention for use in a numerically controlled machine such as shown in FIG. 1.

FIG. 3 is a side plan view of the tapping tool and drive shown in FIG. 2.

FIG. 4 is a side plan view of the tapping tool shown in FIGS. 2 and 3 taken at right angles to the view of FIG. 3.

FIG. 5 is a plan view of the bottom end of the tool shown in FIGS. 2-4.

FIG. 7 is a diagrammatic side plan view of an alternative embodiment wherein a universal joint is employed between the spindle and the independent motor drive for the tool.

The invention and its various embodiments may now be understood by turning to the following detailed description.

DETAILED DESCRIPTION OF THE PREFERRED EMBODIMENTS

An improved numerically controlled machine tool is provided by resiliently coupling an independent drive mechanism to a toolholder which in turn is fitted to the numerically controlled machine. The drive mechanism in turn is coupled to a working tool used for drilling, tapping, milling or other machine functions. The drive mechanism and the toolholder are resiliently coupled together so that they may be relatively displaced one with respect to each other depending upon the amount of vertical force being through the working tool applied to the drive mechanism tending to urge the drive mechanism either toward or away from the toolholder. The torque, power and/or rate of rotation of the working tool is controlled as a function of the relative displacement of the working tool with respect to the toolholder along a predetermined axis of coupling between them. A longitudinal force exerted on the working tool is a function of a spring constant of the resilient coupling between the drive mechanism and toolholder and their relative displacement. The vertical thrust of the working tool is hence both proportional and limited.

Figure 1:
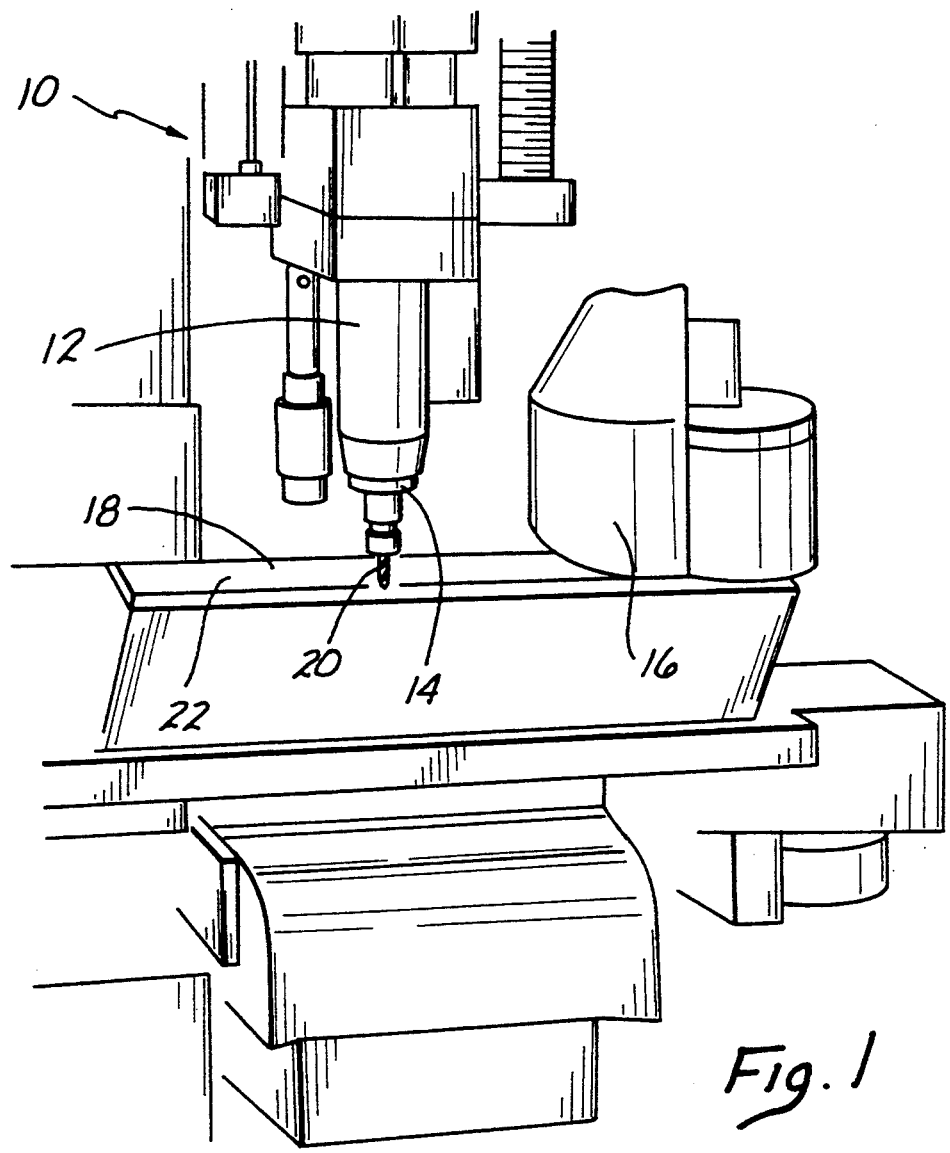
FIG. 1 is perspective view of a numerically controlled spindle known in the prior art which may be used as a tapping machine.

The invention is used in combination with numerically controlled machinery, one example of which is shown in the perspective view of FIG. 1. The numerically controlled machine, generally denoted by reference numeral 10, in the illustrated embodiment includes a computer controlled spindle 12 having a chuck (not shown) in which a tool 14 is held. Additional tools may be contained within a tool carousel 16 so that tools 14 may be automatically changed to perform a sequence of machining steps on a workpiece pursuant to the computer control program. The workpiece (not shown) is held on a bed 18 by a vise, jig or other appropriate fixture to be drilled, tapped, milled or otherwise machined.

In the illustrated embodiment, a tap 20 is held within tool fixture 14 although any type of machine tool now known or later devised may be employed in combination with the invention. Machine 10 of FIG. 1 includes a means for providing recirculating cooling or cutting oil which is recovered in a trough 22 surrounding the workpiece bed 18 as is well known in the art.

FIGS. 2–5 illustrate a tool fixture 14 devised according to the invention. Tool fixture 14 includes a tool holder 24 which includes a keyed collar 26 and retention knob 28 for engagement within spindle 12 according to principles and designs well known in the art. Vertical motion in either direction is coupled to tool fixture 14 by means of elements 24–28 in tool fixture 14 which is vertically advanced or withdrawn as a whole according to computer control. The means by which this vertical motion of spindle 12 is effected is conventional, the details of which are not material to the invention and therefore will not be described with further specificity.

Tool fixture 14 has been particularly modified in the present invention beginning with a mechanism plate 30 which is fixed to shaft 32 shown in FIGS. 3 and 4, which together with elements 24–28 collectively form the toolholder. Mechanism plate 30 has extending therefrom in the illustrated embodiment two motor mount slides 34. Motor mount slides 34 are shown as being cylindrical rods fixed to mechanism plate 30 and extending vertically downward therefrom to provide a sliding support for a motor mount 36. Any number of motor mount slides 34 other than two may be employed.

Motor mount 36 is comprised of a block through which two vertical bores have been defined into which bores 38 corresponding motor mount slides 34 are telescopically disposed. Sufficient clearance is provided between bores 38 and motor mount slides 34 to permit ease of movement of motor mount 36 along slides 34. The clearance, however, is not so great as to provide for any significant unguided movement of motor mount 36 from its vertical travel on slides 34. In other words, the tolerance of the outer diameter of slides 34 and the inner diameter of bores 38 is less than the maximum lateral tolerance that would be permitted in the machine as a whole.

Figure 6:
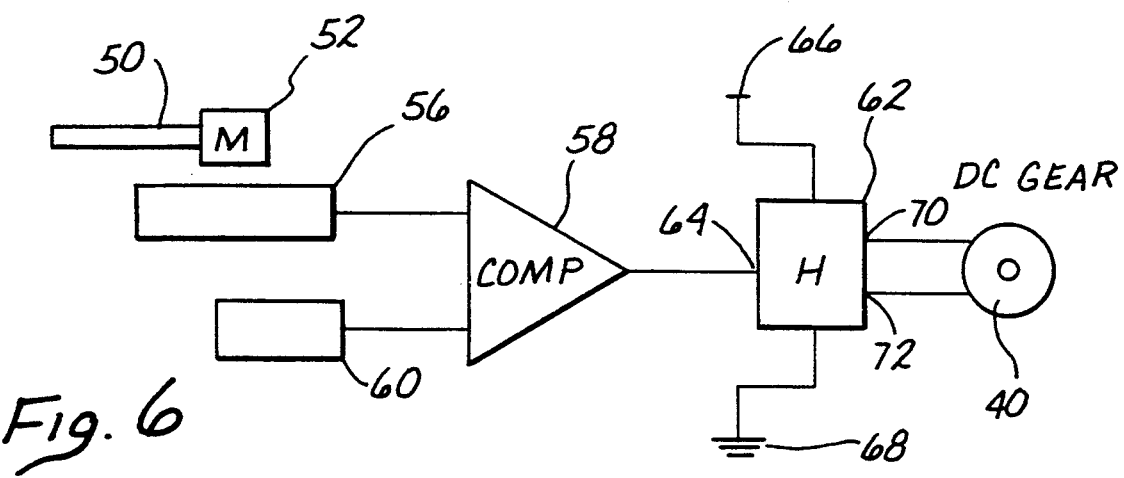
FIG. 6 is a schematic diagram of a circuit for controlling the tool shown in FIGS. 2-5 used in the numerical controlled machine of FIG. 1.

Fixed to or within motor mount 36 is a DC gear motor 40 having a chuck 42 extending therefrom which is diagrammatically shown in FIGS. 2-5. Attached to the side of motor mount 36 is an electronics module 44. Electronics module 44 is coupled to motor 40 to provide a drive signal to motor 40 as described below. Power is provided to electronics module 44 through a pair of flexible conductors 46 which extends from electronics module 44 to and through mechanism plate 30 to a pair of electrical terminal pins 48 mounted on plate 30. Pins 48 are arranged and configured on mechanism plate 30 to fit within a corresponding electrical socket (not shown) provided on or near spindle 12. When tool fixture 14 is inserted within spindle 12, it is automatically aligned through the conventional computer control of machine 10 to insert electrical connecting pins 48 into their corresponding sockets thereby providing DC power to motor 40 and electronics module 44. A magnet holder 50 extends from mechanism plate 30 and has fixed on its end a permanent magnet 52. Permanent magnet 52 is mounted over and in the proximity of a linear Hall effect device contained within electronics module 44 as is described in greater detail in the schematic of FIG. 6.

Each motor mount slide 34 has a spring 54 disposed around it connecting motor mount 36 with mechanism plate 30. Therefore, the motor mount 36 and hence motor 40 and chuck 42 are free to resiliently move upward and downward on motor mount slides 34 as permitted by the extension or compression of springs 54 during operation of tool fixture 14. The relative vertical position of chuck 42 with respect to spindle 12 is detected by linear Hall effect device 56 in FIG. 6. Turn now to the schematic of FIG. 6. The output of linear Hall effect device 56 is DC voltage which is a function of the relative position of magnet 52 along the vertical length linear Hall effect device 56 which in turn is oriented and parallel with the longitudinal axis of tool fixture 14 and hence spindle 12.

The DC output of Hall effect device 56 is coupled to one input of a comparator 58. The other input of comparator 58 is coupled to a generator 60 which may, for example, be a saw tooth or triangular wave generator. In the illustrated embodiment, generator 60 generates a ramped function at or above 20 kilohertz to avoid drive signals in the audio range.

The output of comparator 58 is a 5 volt square wave pulse which has a pulse width proportional to the DC voltage output from linear Hall effect device 56. In other words, when the DC voltage from hall device 56 is very low, the ramped voltage of generator 60 will exceed the Hall voltage, which can be treated as trigger voltage, for a significant percentage of the duty cycle of the ramped wave. This then causes comparator 58 to generate a high duty cycle output. On the other hand when the Hall voltage from device 56 is very high, the wave form from generator 60 will exceed the trigger voltage for only a small portion of the ramped voltage, thus causing comparator 58 to generate a pulse with a very small duty cycle.

The output of comparator 58 is coupled to the control input of a conventional H-switch 62. The function of the H-switch is to reverse the supply voltages supplied to switch 62 according to the level of control signal provided at its input 64. H-switch 62 is coupled between the DC power supply 66, typically 30 volts DC, and ground 68.

In the illustrated embodiment when the output of comparator 58 is low or near zero volts, a first plurality will be provided on outputs 70 and 72, for example a positive 38 volts on output 70 and ground on output 72. However when the pulse from comparator 58 goes high, in the illustrated embodiment to plus five volts, H-switch 62 will have switched the polarity of it outputs so that the positive 38 volts appears on output 72 and ground on output 70. As a consequence, a polarity with one sense or the other is selectively applied to DC gear motor 40 which is coupled to and derives its power from output 70 and 72. The speed and sense of rotation of gear motor 40 will be determined by the duty cycle of the pulse widths applied by a H-switch 62 on output 70 and 72. A 50 percent duty cycle at 20 kilohertz or above, for example, will not drive motor 40 in either direction, but will fix it in position defined as the null position. Duty cycles of less than or more than 50 percent will then drive motor 40 in either counterclockwise or clockwise direction and at a speed which is proportional to the degree by which the driving duty cycle differs from 50 percent or null position.

The various elements of tool fixture 14 now having been described, consider now the method of operation of the device. With tool fixture 14 fitted into spindle 12, the device will be adjusted such that the position of permanent magnet 52 over Hall effect device 56 contained within electronics module 44 will be at the null position at which position motor 40 will not be driven. A tap, for example, is disposed within chuck 42. The spindle is now driven downwardly according to the computer control of machine 10. Spindle 12 will have a downward vertical thrust at a predetermined rate determined only by numerical control programming. Tap 74, which will not be rotating, will then be disposed into a body bore 76 of a workpiece 78. Bore 76 will have been drilled during a prior machine operation.

When tap 74 contacts bore 76, the outer diameter of tap 74 will be slightly greater than the inner diameter of the unthreaded bore 76 thereby forcing tap 74 and motor mount 36 collectively upward against the compression force of springs 54. When this occurs, magnet 52 will be moved downwardly relatively to motor mount 36 and the relative movement between motor mount 56 and spindle 12 will be detected by device 56.

This will cause motor 40 to begin to rotate in a direction which allow tap 74 to cut into bore 76. As tap 74 rotates, it will cut into the inner surface of bore 76 and begin to cut the internal threads. If spindle 12, which is independently controlled by its own computer, drives downwardly faster than the natural cutting rate tap 74 as determined by its own pitch and speed of rotation, magnet 52 will continue to be displaced downward relative to Hall effect device 56, thereby increasing or decreasing the duty cycle as may be appropriate to drive motor 40 at a higher speed in the appropriate direction to cause tap 74 to cut. Tap 74, now being driven or rotated at a faster rate, will cut according to its pitch more quickly into bore 76 and will tend to thereby match the computer controlled rate of descent of spindle 12. The reverse is also true should the rate of rotation of tap 74 be at a speed which causes it to feed into bore 76 at rate greater than the advance of spindle 12.

In this way, the advance of tap 74 is always adjusted to match the advance of spindle 12 and the stress or vertical thrust between the cutting surfaces of tap 74 and the threads being cut into bore 76 are always minimized according to the control circuitry, never to exceed the compression or extension force provided by springs 54. Tap 74 is thus provided with a minimal noncutting and wearing force which would either distort or destroy the threads being cut into bore 76 or prematurely wear out tool 74. It has been found according to the invention that taps utilized in the tool fixture of the invention have a lifetime of 10 to 100 times greater than experienced with the same tap used in conventional spindles according to conventional numerical controlled machining techniques.

The lifetime of tapping tool 74 is particularly and even more dramatically extended when materials which are difficult to cut, such as titanium and other exotic metals comprise workpiece 78. In many instances, hard exotic metals are often so difficult to tap in production that the cost of tap replacement will often form a significant fraction of the workpieces machining cost. This disadvantage is entirely avoided by the present invention.

Further, it must be appreciated that when tapping metal or other materials, the metal workpiece is not entirely homogenous and for that and many other reasons, tapping tool 74 may tend to seize or jam within bore 76. This is a commonly felt experience when manually tapping bores and is sensed by tapping to a depth until rotation of the tap becomes more difficult. Thereafter, the tap is reversed, the chips cleared and the tap manually reinserted until an additional length of threading is tapped out. The process continues until the entire bore threaded. In the case of numerically controlled production tapping, the tap is not inserted, reversed to clear the chips, then reinserted, again reverse and so forth to tap the entire hole. Instead, the tap is advanced in one smooth motion until the entire bore 76 is fully tapped at which point the downward movement of spindle 12 is stopped and the tap then unscrewed from the bore. In a conventional tapping machine, the binding within the bore of the tapping tool is simply overridden by the high torque of the tapping machine. Again, the result is possible distortion and destruction of some of the threading within the bore as well as premature wearing of a tapping tool.

In the present invention, if for any reason the tap starts to become jammed and resistance to tapping increases, the result will be that the speed of rotation of the tapping tool will tend to decrease. The invention tends to keep the speed constant by outputting a variable power or torque through DC motor 40. If the speed of revolution of tap 74 starts to decrease, its vertical advance within workpiece 78 will decrease. Meanwhile, spindle 12 continues to independently advance downwardly at a constant rate and the relative displacement between magnet 52 and Hall effect device 56 will tend to increase. This in turn will cause the duty cycle to change to apply a higher torque or power to the gear motor tending to rotate tap 74 at a constant speed and to advance tap 74 into workpiece 78 at a rate which matches spindle 12. The vertical stress placed upon the cutting edges of tapping tool 74 and the threads cut within bore 76 will, however, never be increased more than the degree of compression allowed by springs 54. The degree of compression of springs 54 are in turn proportional to the relative vertical displacement of spindle 12 and tapping tool 74, which compression can be varied according to selection of the spring constants. Both the rate of change of torque applied to tapping tool 74 and the rate of change in the vertical force urging tapping tool 74 into workpiece 78 is smooth, continuous and a function of the degree to which the workpiece is resisting the cutting of tapping tool 74.

It is not necessarily the case that tapping tool 74 will always exactly match the vertical rate of descent of spindle 12. In fact, in a difficult workpiece 78, tapping tool 74 may always lag behind the rate of descent of spindle 12. The distance of the lag will be accommodated by the amount of vertical separation between mechanism plate 30 and motor mount 36, which is never exceeded when the spindle rates of advance are properly selected.

Ultimately, spindle 12 will reach the maximum extent of its downward decent as controlled by the computer within machine 10. Spindle 12, which is not rotating, will then stop. If the vertical rate of descent of tapping tool 74 is lagging behind the vertical rate of descent of spindle 12, tapping tool 74 will still continue to be rotated by motor 40 and advancing within bore 76 until it catches up, at which point the relative position of magnet 52 to Hall effect device 56 will have resumed the null position and motor 40 will be stopped. At no point however will the vertical thrust on tap 74 ever be more than permitted by springs 54.

Bore 76 has now been completely tapped and tap 74 is stopped at its maximum position of insertion into bore 76. Spindle 12 according to its computer control will now begin to move vertically upward at a predetermined rate. As this occurs, springs 54 will be extended as motor mount 36 moves away from the null position thereby creating a relative displacement between magnet 52 and Hall effect device 56 in the opposite direction. This cause the duty cycle to be changed to the opposite of its null or 50 percent position and thereby begins to drive motor 40 in the opposite direction causing tap 74 to be unscrewed from threaded bore 76.

Tap 74 is unscrewed from bore 76 at a rate which tends to match the linear rate of withdrawal of spindle 12, but never with an upward vertical thrust greater than that permitted by the extension of springs 54. If spindle 12 is removed far too quickly, tapping tool 74 will simply lag behind spindle 12 operating at a higher speed of rotation and thus rate of withdraw, but again never exceeding to the spring force extension caused by the lag.

Thus it can be readily understood that both the downward and upward thrust of spindle 12 on tap 74 is cushioned through springs 54 while at the same time the speed of rotation of tap 74 is adjusted to minimize the degree of lag between tap 74 and spindle 12 both in the cutting and withdrawal operations. The result is that a superior cutting performance is realized from tap 74 with minimal wear, with maximal lifetime of the tool, and hence minimal tooling cost.

The illustrated embodiment has been shown in connection with a mechanism plate 30 which has been fixed to shaft 32. It is also entirely within the scope and contemplation of the invention that mechanism plate 30 may be replaced by a swivel mechanism or universal joint 74 diagrammatically shown in the side plan view of an alternative embodiment of FIG. 7. Any type of joint 74 may be used, whether automatically or manually driven, and configured to provide off axis angles for motor 40 and chuck 42. Thus it must be understood that in addition to the particular features of the invention provided by motor 40 which are realized in a tapping machine, it is also expressly within the scope of the invention that the additional advantages of an independent motor mounted drive on any type of tool, which motor drive is incorporated as part of the tool fixture itself used in combination with a machine 10 is within the scope of the invention. The use of such tool fixture motors can be usefully employed in many milling, drilling, tapping and machining operations which are on and off axis in the manner as taught by the invention.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the germ of the invention.

I claim:

1. An apparatus for use with a computer controlled machine comprising:
   a toolholder adapted for coupling with said computer controlled machine;
   an independent drive mechanism for driving a working tool, said drive mechanism being resiliently coupled to said toolholder; and
   a control circuit for controlling said drive mechanism, said control circuit being responsive to relative displacement of said drive mechanism with respect to said toolholder so that said working tool is driven as a function of said relative displacement between said toolholder and drive mechanism,
   whereby machining by said computer control machine is improved and effective lifetime of said working tool extended.

2. The apparatus of claim 1 wherein said independent drive mechanism selectively rotates said working tool about a predetermined axis, said working tool being rotated with a torque proportional to said relative displacement between said toolholder and said drive mechanism.

3. The apparatus of claim 2 wherein said toolholder has a longitudinal axis and wherein said predetermined axis of said independent drive mechanism is parallel to said longitudinal axis.

4. The apparatus of claim 2 wherein said toolholder has a longitudinal axis and wherein said predetermined axis is arbitrarily oriented with respect to said longitudinal axis.

5. The apparatus of claim 1 wherein said control circuit increases and decreases the rate of rotation of said working tool as a function of said relative displacement between said tool holder and said working tool coupled to said drive mechanism.

6. The apparatus of claim 1 wherein said rate of rotation of said working tool is controlled as a function of the said relative displacement between said toolholder and said drive mechanism.

7. The apparatus of claim 1 wherein torque is applied to said working tool by said drive mechanism and said torque is controlled by said control circuit as a function of said relative displacement between said toolholder and said drive mechanism.

8. The apparatus of claim 1 wherein said drive mechanism couples energy into said working tool at a rate defined as power and wherein said control circuit controls said drive mechanism so that said power is a function of said relative displacement between said toolholder and said drive mechanism.

9. The apparatus of claim 1 wherein said control circuit controls the rate of rotation and direction of rotation of said working tool as driven by said drive mechanism as a function of said relative displacement between said toolholder and said drive mechanism.

10. The apparatus of claim 1 wherein said drive mechanism is resiliently coupled to said toolholder by at least one spring, said control circuit controlling said drive mechanism such that vertical force applied to said working tool is a function of only spring compression or spring extension.

11. The apparatus of claim 10 wherein said working tool is a tap.

12. The apparatus of claim 1 wherein said control circuit comprises:
    a detector for measuring relative displacement of said drive mechanism with respect to said toolholder;
    a variable pulse generator coupled to said detector for measuring said relative displacement and responsive thereto to generate a control pulse having a duty cycle which is a function of said relative displacement;
    an H-switch coupled to said pulse generator having an output; and
    wherein said independent drive mechanism comprises a motor coupled to said output of said H-switch.

13. The apparatus of claim 12 wherein said detector for measuring said relative displacement comprises a permanent magnet fixed with respect to said toolholder and a Hall effect device disposed adjacent to said permanent magnet and fixed relative to said drive mechanism, said Hall effect device generating a trigger signal which is a function of relative displacement of said permanent magnet and Hall effect device, said trigger signal being coupled to said pulse generator to control pulse widths of pulses output from said pulse generator.

14. An apparatus for use with a computer controlled machine tool comprising:
    a toolholder, said toolholder being coupled to said machine tool;
    a working tool;
    an independent drive mechanism coupled to said working tool for driving said working tool, said drive mechanism also being coupled to said toolholder, so that said computer controlled machine tool selectively positions said drive mechanism and so that machining force is provided to said working tool solely through said drive mechanism,
    wherein said toolholder and working tool each have longitudinal axes and wherein said longitudinal axis of said working tool is arbitrarily oriented with respect to said longitudinal axis of said toolholder.

15. A method for machining a workpiece comprising the steps of:
    selectively disposing a tool fixture by means of a computer controlled machine;
    driving a working tool coupled to said tool fixture independently from disposition of said tool fixture by means of said computer controlled machine, said working tool being driven as a function of sensed machining performed by said working tool on said workpiece,
    relatively displacing said working tool with respect to said tool fixture; and
    controlling said step of driving said working tool as a function of the degree of relative displacement of said working tool with respect to said toolholder, whereby tool life is extended.

16. The method of claim 15 where said step of controlling comprises the step of controlling the sense and the rate of rotation of said working tool, and where said step of driving comprising the step of rotating said working tool.

17. The method of claim 16 wherein said working tool has a longitudinal axis about which said tool is rotated and wherein said step of controlling controls the amount of force applied to said working tool along said longitudinal axis simultaneously with said step of controlling said rate of rotation of said tool about said longitudinal axis.

* * * * *